United States Patent
Mack et al.

(10) Patent No.: US 8,948,961 B2
(45) Date of Patent: Feb. 3, 2015

(54) APPARATUS AND METHOD FOR DETECTING A PEDESTRIAN IMPACT

(75) Inventors: Frank Mack, Seoul (KR); Sascha Steinkogler, Freiburg (DE)

(73) Assignee: Robert Bosch GmbH, Stuttgart (DE)

( * ) Notice: Subject to any disclaimer, the term of this patent is extended or adjusted under 35 U.S.C. 154(b) by 1344 days.

(21) Appl. No.: 12/160,707

(22) PCT Filed: Nov. 30, 2006

(86) PCT No.: PCT/EP2006/069151
§ 371 (c)(1),
(2), (4) Date: Apr. 9, 2010

(87) PCT Pub. No.: WO2007/087916
PCT Pub. Date: Aug. 9, 2007

(65) Prior Publication Data
US 2010/0191401 A1    Jul. 29, 2010

(30) Foreign Application Priority Data
Jan. 11, 2006   (DE) .......................... 10 2006 001 366

(51) Int. Cl.
| | |
|---|---|
| G01M 17/00 | (2006.01) |
| G06F 7/00 | (2006.01) |
| G06F 19/00 | (2011.01) |
| G06F 11/30 | (2006.01) |
| G07C 5/00 | (2006.01) |
| B60R 21/34 | (2011.01) |
| B60R 21/0132 | (2006.01) |
| B60R 21/0136 | (2006.01) |
| B60R 21/01 | (2006.01) |

(52) U.S. Cl.
CPC ............. *B60R 21/34* (2013.01); *B60R 21/0132* (2013.01); *B60R 21/0136* (2013.01); *B60R 2021/0119* (2013.01)

USPC ....... 701/33.9; 701/32.2; 701/33.7; 701/33.8; 340/436; 180/232

(58) Field of Classification Search
USPC .............. 701/124, 32.1, 300, 301, 32.2, 33.7, 701/33.8, 33.9; 340/436, 903; 342/455; 180/271, 232, 282
See application file for complete search history.

(56) References Cited

U.S. PATENT DOCUMENTS 5,583,771 A * 12/1996 Lynch et al. .................... 701/36
6,426,567 B2 * 7/2002 Ugusa et al. ................. 307/10.1

(Continued)

FOREIGN PATENT DOCUMENTS

| | | |
|---|---|---|
| CN | 1611966 | 5/2005 |
| CN | 1705578 | 12/2005 |
| DE | 103 48 386 | 2/1969 |
| DE | 10357352 A1 * | 7/2005 |
| DE | 10 2005 012 949 | 9/2006 |
| DE | 10 2005 013 595 | 9/2006 |
| DE | 10 2005 038 591 | 2/2007 |
| DE | 10 2005 046 928 | 4/2007 |
| EP | 1 375 261 | 1/2004 |
| EP | 1 500 562 | 1/2005 |
| JP | 2002-178872 | 6/2002 |
| JP | 2005-289227 | 10/2005 |
| WO | WO 2004076242 A1 * | 9/2004 |
| WO | 2005/056345 | 6/2006 |

OTHER PUBLICATIONS

International Search Report, PCT/EP2006/069151, dated Mar. 23, 2007.

*Primary Examiner* — Rami Khatib
(74) *Attorney, Agent, or Firm* — Kenyon & Kenyon LLP

(57) ABSTRACT

A method and an apparatus for detecting a pedestrian impact, at least three acceleration sensors being provided which are respectively mounted on the inner side of the bumper cladding and each generate a signal. The pedestrian impact is detected as a function of a time offset between at least two of the three signals. The impact location is identified on the basis of the at least one time offset.

20 Claims, 2 Drawing Sheets

(56) References Cited

U.S. PATENT DOCUMENTS

| | | | |
|---|---|---|---|
| 6,561,301 B1 * | 5/2003 | Hattori et al. | 180/274 |
| 7,039,513 B2 | 5/2006 | Hermann et al. | |
| 2002/0033755 A1 * | 3/2002 | Ishizaki et al. | 340/436 |
| 2004/0002815 A1 * | 1/2004 | Ishizaki et al. | 701/300 |
| 2005/0096816 A1 * | 5/2005 | Takafuji et al. | 701/45 |
| 2005/0109075 A1 * | 5/2005 | Kithil et al. | 73/12.09 |
| 2006/0047392 A1 * | 3/2006 | Hermann et al. | 701/45 |
| 2007/0124047 A1 * | 5/2007 | Roelleke | 701/45 |
| 2007/0162208 A1 | 7/2007 | Groeger | |

\* cited by examiner

APPARATUS AND METHOD FOR DETECTING A PEDESTRIAN IMPACT

BACKGROUND INFORMATION

The use of acceleration sensors to detect a pedestrian impact is described in German Patent Application No. DE 10348386.

SUMMARY OF THE INVENTION

The apparatus and method according to the present invention for detecting a pedestrian impact have, in contrast thereto, the advantage that a configuration of at least three acceleration sensors, which are mounted on the inner side of the bumper cladding, is used. Preferably, an acceleration sensor is disposed respectively to the right and to the left, and the third acceleration sensor is disposed in the middle. By evaluating a time offset of the signals occurring from the three acceleration sensors, it is advantageously possible to detect the pedestrian impact itself, and also the impact location, in simple fashion. An evaluation circuit that is disposed in a control unit, for example in an airbag control unit, is used to evaluate these acceleration signals; some of the evaluation can also be carried out in the acceleration sensors themselves.

The method and apparatus according to the present invention are characterized by their robustness. In addition, impacting objects of more than negligible width, for example a shopping cart, can be recognized if the threshold of all three sensors is exceeded practically simultaneously or within a very small, possibly velocity-dependent time interval.

With the present invention, it is possible reliably to distinguish triggering from non-triggering cases.

An underlying idea of the present invention is to ascertain the impact location using the at least three sensors. This is based on the fact that the propagation speed of deformation sound and solid-borne sound in the plastic of the bumper cladding is relatively slow. As a result, an acceleration sensor that is located farther away from the impact location will generate the signal later than will a sensor that is mounted in the vicinity of the impact location.

Because of the proximity of at least one of the acceleration sensors to the impact location, penetration of the impacting object into the vehicle can also be recorded. An average distance of 20-30 cm from the acceleration sensor to the impact location has proven particularly advantageous.

It is particularly advantageous that the respective signals of the acceleration sensors can be generated when the signal exceeds noise thresholds that are predefined or are determined adaptively, for example as a function of speed. Such noise thresholds are, for example, between 3 and 5 G.

Alternatively, however, it is possible for the signals also to be generated when the signal exhibits certain signal features, i.e. shapes. This can be determined, for example, as a function of a maximum or minimum or other conspicuous signal shapes, or a specific magnitude, such as the first or second integral quotient or the differential quotient of the acceleration signal.

It is additionally advantageous that a counter is provided which ascertains the at least one time offset. This counter can be a timer module that is disposed in the control unit, or it is implemented as software in a microcontroller in the control unit. The microcontroller is then the evaluation circuit.

Advantageously, the time offset is determined from the first two signals that occur, i.e. the two acceleration sensors that are located closest to the impact location; and the third acceleration sensor is used, with its signal, for plausibilization. The apparatus and method according to the present invention thereby become particularly robust.

It is additionally advantageous that the signals are weighted after their occurrence. This takes into account the fact that the sensor that generates the signal first, i.e. is closest to the impact location, generates the signal that is most important for analyzing the impact and the impacting object. As a result, the analysis is decisively improved and weaker signals do not have such a great effect on the analysis.

Advantageously, however, the signals can also be summed or integrated over time. "Integration" here means a kind of integration that is possible in terms of calculation technology. On the basis of the first integral or its first sum, a mass determination or estimate of the impacting object can be carried out via the pulse set. This modifies the second integral or a doubly summed sum, and this second sum or the second integral can then advantageously be used to determine the penetration depth of the impacting object into the vehicle. By way of the penetration depth, it is possible to achieve good discrimination of objects that are otherwise difficult to distinguish, e.g. soft and heavy ones (such as a human being) from hard and light ones. The reason is that at a given speed, a heavy object penetrates farther into the bumper than a light one.

DETAILED DESCRIPTION

Acceleration sensors for detecting a pedestrian impact have already been proposed. The problem arises here of robustly separating triggering from non-triggering cases. What is necessary here in particular is impact offset detection, since the bumper's rigidity changes along the transverse direction of the vehicle, and the sensor signals from one and the same impacting object at the same speed depends on the offset. This problem is solved by the apparatus and method according to the present invention by using at least three acceleration sensors that are disposed on the bumper cladding. In this context, the time offset of the signals of the acceleration sensors is evaluated.

Figure 1:
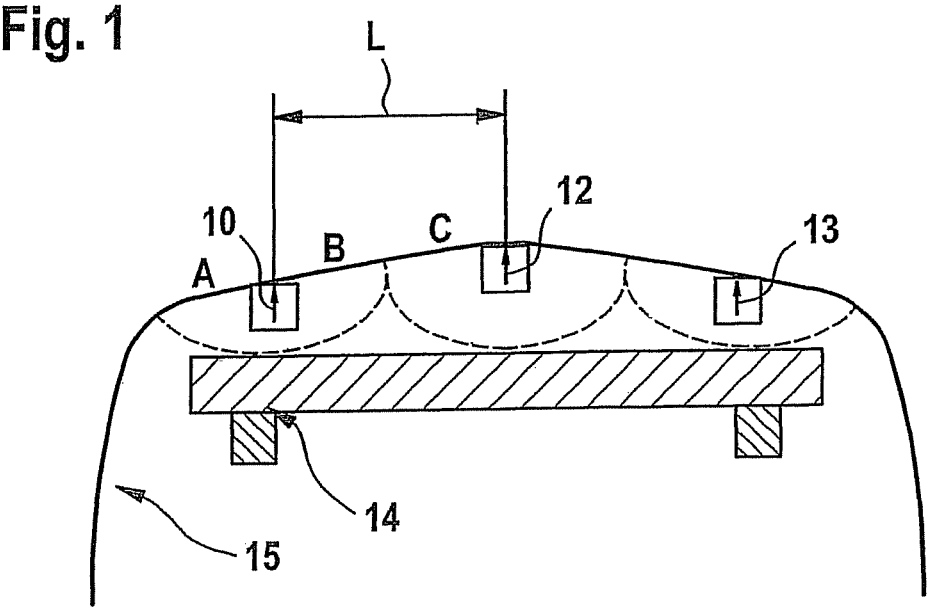
FIG. 1 shows an assemblage in accordance with the apparatus according to the present invention.

FIG. 1 depicts the disposition of the apparatus according to the present invention. An assemblage of three acceleration sensors 10, 12, and 13 is provided on bumper cladding 15, which is fabricated largely from plastic. The acceleration sensors are, for example, bolted to bumper cladding 15 via holders. A flexural member 14 of the vehicle is provided behind acceleration sensors 10, 12, and 13. The dashed lines indicate the propagation of signals. A distance L is provided between the sensors.

If an impact then occurs at location A, sensor 10 is the first to supply a signal, at time t0. Sensor 12 then supplies a signal with a time offset $\Delta t12_1 = L/c$, where L is the distance to sensor 10 and C is the propagation speed of solid-borne sound in the bumper. Sensor 13 supplies a signal having a time offset $t13_2 = 2(L/c)$.

If an impact occurs at impact location B, sensor 10 once again supplies the first signal and therefore the starting point t0. Sensor 12 supplies its signal with a time offset $\Delta t12_1 = (d/$ c)<(L/c). Sensor 13 supplies the time offset $\Delta t13_2 = [(d+L)/c] < 2(L/c)$. Distance d is the distance from sensor 12 to impact point P.

In the case of an impact at impact point C, sensor 12 now supplies the first signal and therefore the starting time t0. Sensor 10 supplies its signal with a time offset $\Delta t12_1 = [(L/d)/c]$, the distance from impact point C to sensor 10 being L−d. Sensor 3 in turn supplies a time offset $\Delta t13_2 = [(d+L)/c]$.

It is assumed in this context that the horizontal extension of the impacting object is negligible. These cases, and the calculation of the ratio of $\Delta t12_1$ to $\Delta t13_2$, can be used in determining the offset, i.e. distance d.

Figure 2:
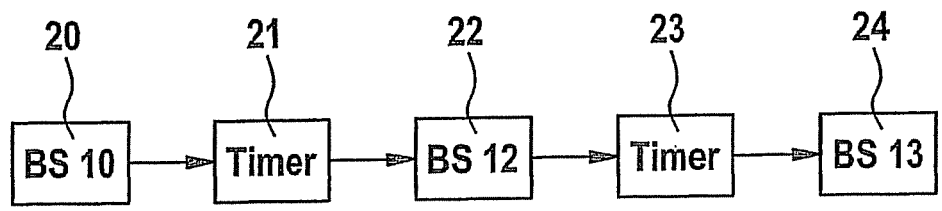
FIG. 2 is a first block diagram.

FIG. 2 explains, in a block diagram, how the signals and the counter coact. In block 20, in the event of, for example, an impact at location A, acceleration sensor 10 generates its signal. This starts timer 21. The time measures the time offset $\Delta t12_1$ until sensor 12 generates its signal in block 22. The timer will then also, in block 23, continue to measure time offset $\Delta t13_2$ until, in block 24, acceleration sensor 13 also generates its signal.

Figure 3:
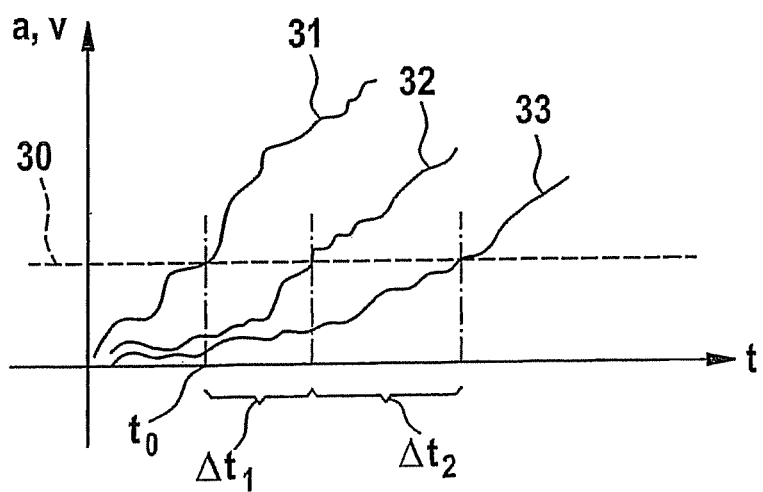
FIG. 3 is an acceleration/time diagram.

FIG. 3 visualizes this in an acceleration/time diagram. Here curve 31 represents the acceleration signal of sensor 10 in the context of an impact at impact point A. At time t0, signal 31 exceeds noise threshold 30. The timer is therefore started at time t0. It measures the time offset $\Delta t_1$ until the signal of sensor 12, here labeled with the reference character 32, also exceeds noise threshold 30. The timer continues, however, to count the time offset $\Delta t_2$ until signal 33 of sensor 13 also exceeds noise threshold 30. Instead of the noise threshold, other signal features can also be used to measure the times.

Figure 4:
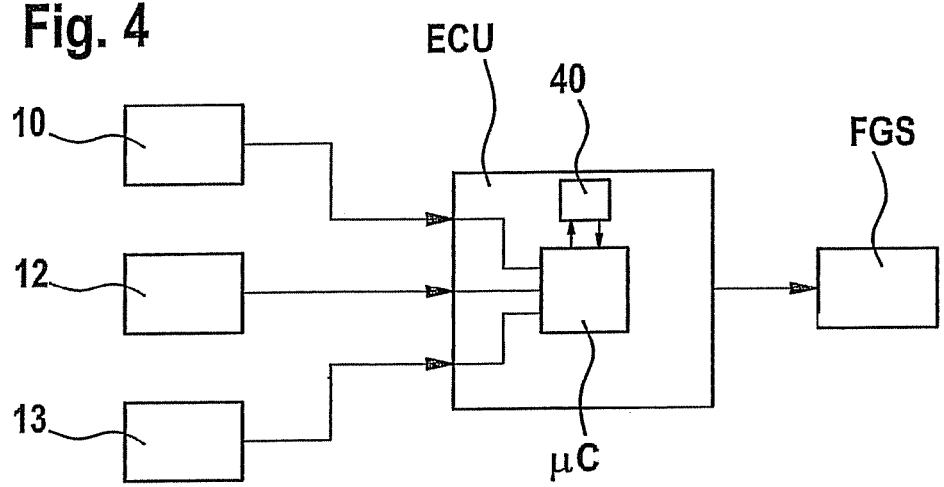
FIG. 4 is a second block diagram.

FIG. 4 shows the apparatus according to the present invention in a further block diagram. Acceleration sensors 10, 12, and 13 are connected via two-wire conductors to a control unit ECU. Acceleration sensors 10, 12, and 13 transfer their data as digital signals, for example using Manchester coding, to control unit ECU. It is possible for acceleration sensors 10, 12, and 13 already to encompass a pre-processing function in their modules. Acceleration sensors 10, 12, and 13 can already check the noise threshold themselves, or the check is handled by control unit ECU via microcontroller µC. For simplicity's sake, interface modules and other modules such as a triggering circuit controller are not depicted here in control unit ECU, since they are not essential to an understanding of the invention. Microcontroller µC evaluates the signals of acceleration sensors 10, 12, and 13 in accordance with the invention, and applies control to pedestrian protection means FGS as a function thereof. Microcontroller µC utilizes a timer module 40 to ascertain the time offset. Alternatively, it is possible for the timer to be simulated by microcontroller µC using software technology.

Figure 5:
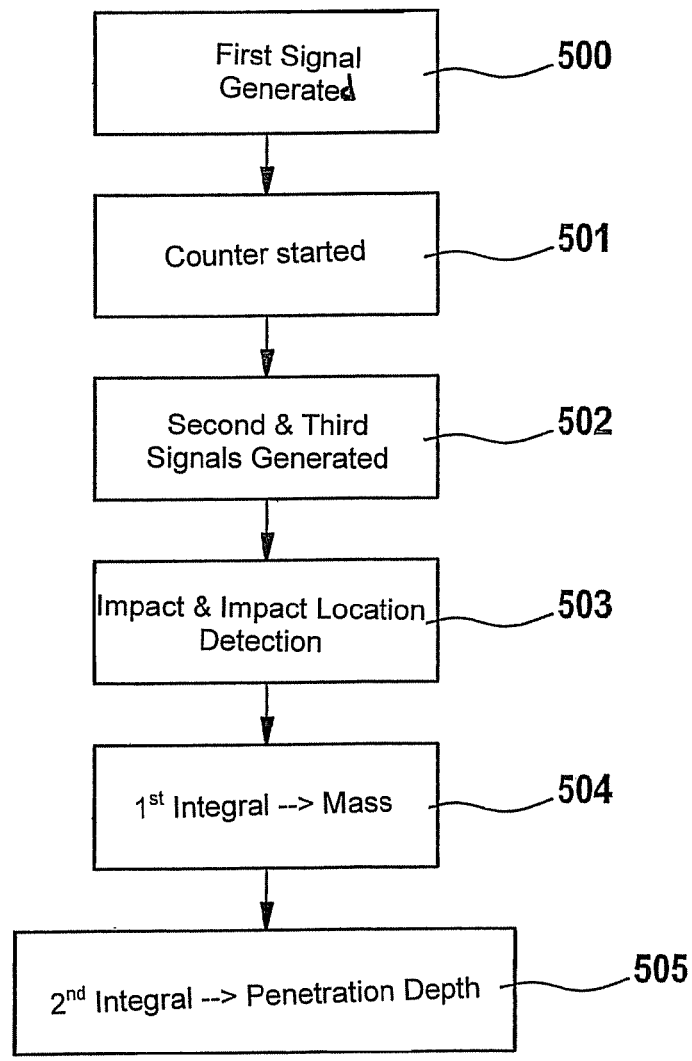
FIG. 5 is a flow chart.

The method according to the present invention, which is executed in the apparatus according to the present invention as shown in FIG. 4, will be further explained with reference to FIG. 5 and specifically to the flow chart depicted. In method step 500, the sensor located closest to the collision point generates its signal. "Signal generation" here means that the signal is above the predetermined threshold, in this case the noise threshold. The counter is then started in method step 501. This is implemented, in the example, by timer module 40, which is started by microcontroller µC. As a consequence of the impact, sensors 12 and 13 also generate the second and third signal, respectively, in method step 502. The time offset is determined by counter 40. Based on the time offset, it is possible to identify the impact location and the impact itself. This is carried out in method step 503. In method step 504, as an option (which is not necessarily the case), a determination is made here of the first integral of the acceleration signal in order additionally to estimate therefrom, via the pulse set, the mass of the impacting object; this is performed in method step 504. The first signal to occur is preferably used as the signal. As a further option, the second integral is calculated here in method step 505 in order to determine the penetration depth of the impacting object. It is then possible on that basis to perform a characterization of the impacting object. Instead of the integrals that are obtained here via microcontroller µC, it is also possible to use other summation techniques. It is understood that the integration is meant to be one that a computer can carry out.

What is claimed is:

1. An apparatus for detecting a pedestrian impact, comprising:
    at least three acceleration sensors respectively mounted on an inner side of a bumper cladding, each of the sensors generating a respective signal, the signals occurring responsive to a pedestrian impact;
    an evaluation circuit that is configured to:
        as a function of a time offset between at least two of the three signals:
            identify an impact location of the pedestrian impact; and
            weight the signals with different respective weights; and
        as a function of the weighted signals, detect an additional characteristic of the pedestrian impact;
    wherein the time offset represents a difference in time from when one of the signals exceeds a noise threshold and another signal exceeds the noise threshold.

2. The apparatus according to claim 1, wherein each of the at least three acceleration sensors generates the respective signal when the respective signal exceeds a respective noise threshold.

3. The apparatus according to claim 1, wherein each of the at least three acceleration sensors generates the respective signal as a function of a signal shape.

4. The apparatus according to claim 1, further comprising a counter that ascertains the time offset.

5. The apparatus according to claim 1, wherein the evaluation circuit determines the time offset from a first two signals that occur, and uses a signal of a third one of the acceleration sensors for plausibilization.

6. The apparatus of claim 1, wherein the weighting of each of the signals is performed after the occurrence of all of the signals.

7. The apparatus according to claim 1, wherein the weighting of the signals is performed based on an order of the occurrence of the signals, so that a first one of the signals that occurs earlier than all others of the signals is weighted higher than all of the others of the signals.

8. The apparatus according to claim 7, wherein, due to the different weightings of the first and second signals, information of the first signal impacts a result of the detection to a greater degree than does information of the second signal.

9. The apparatus according to claim 1, wherein the weighting of the signals is according to their occurrence.

10. The apparatus according to claim 1, wherein the weighting of the signals is based on an order of the occurrence of the signals.

11. The apparatus according to claim 1, wherein the identification of the impact location is performed without use of the different respective weights.

12. The apparatus according to claim 1, wherein the additional characteristic is a mass of an impacting object.

13. The apparatus according to claim 1, wherein the additional characteristic is a penetration depth of an impacting object.

14. A method for detecting a pedestrian impact, comprising:
generating a respective signal responsive to a pedestrian impact and by each of at least three acceleration sensors which are respectively mounted on an inner side of a bumper cladding;
as a function of a time offset between at least two of the three signals:
identifying an impact location of the pedestrian impact; and
weighting the signals with different respective weights; and
detecting an additional characteristic of the pedestrian impact as a function of the weighted signals;
wherein the time offset represents a difference in time from when one of the signals exceeds a noise threshold and another signal exceeds the noise threshold.

15. The method according to claim 14, wherein the respective signal is generated when the respective signal exceeds a respective noise threshold.

16. The method according to claim 14, wherein the respective signal is generated as a function of a signal shape.

17. The method according to claim 14, further comprising:
determining the time offset from a first two signals that occur, and a third signal is used for plausibilization.

18. The method according to claim 14, wherein the weighting of each of the signals is performed after the occurrence of all of the signals.

19. The method according to claim 14, wherein the detecting includes:
integrating or summing a respective signal over time; and
using a first integral or a first sum for a determination of a mass of an impacting object.

20. The method according to claim 14, wherein the detecting includes:
integrating twice or summing twice a respective signal over time; and
using a second integral or a second sum to determine a penetration depth of an impacting object into a vehicle.

* * * * *